May 9, 1933.  L. N. HAMPTON  1,908,346

GAUGE

Filed Dec. 4, 1929

INVENTOR
L. N. HAMPTON
BY J. MacDonald
ATTORNEY

Patented May 9, 1933

1,908,346

UNITED STATES PATENT OFFICE

LEON N. HAMPTON, OF NEW YORK, N. Y., ASSIGNOR TO BELL TELEPHONE LABORATORIES, INCORPORATED, OF NEW YORK, N. Y., A CORPORATION OF NEW YORK

GAUGE

Application filed December 4, 1929. Serial No. 411,428.

This invention relates to gauges. In manual telephone switchboards, telephone connections are established through the insertion of plugs in spring jacks.

In such switching devices, however, owing to the small distance which the contacts are moved when engaged by the plug, only a relatively small amount of wear between the jack sleeves and the plugs is permissible in order to insure the proper operation of the contacts. In the testing of damaged plugs, owing to the fact that the wear is not distributed evenly all around the configuration of the plug, the extent of movement of the jack sleeve springs cannot be accurately ascertained by diameter measurement of the plugs. It has been found that while a relatively large percentage of damaged plugs showed diameter measurements within the requirements of permissible wear, these plugs when inserted in the jack sleeves failed to operate the springs or in some cases would damage them, and that this latter effect was due to the fact that the component parts entering into the embodiment of the plug were bent in the course of switching operations and forced out of their coaxial alignment.

The object of this invention is to provide a gauge for testing telephone plugs while in service, and which will be simple, cheap to manufacture and wherein the distance at which the contact springs are opened is accurately determined and indicated in terms of the serviceability of the plugs, and wherein the testing operation is effected in a minimum of time.

The gauge of this invention is constructed to represent a spring-jack having a sleeve worn to the limit of permissible wear, and an anvil which is shaped and located to represent a tip spring of a jack. The anvil is mounted on a spring retracted yoke, and carries a pointer which reads against a scale. When a plug under test is inserted in the gauge the anvil is forced tightly into the tip spring crevice which tips the plug off center in the sleeve of the gauge. The reading on the scale is then a measure of the amount of wear. An adjustable device is provided on the gauge for adjusting the pointer to read definite values representing maximum permissible wear limits while permitting the retention of the zero or starting position of the pointer on the scale, and means is provided for positively holding the anvil on the plug under test and for returning the pointer in the zero position after each successive testing operation.

Figure 1:
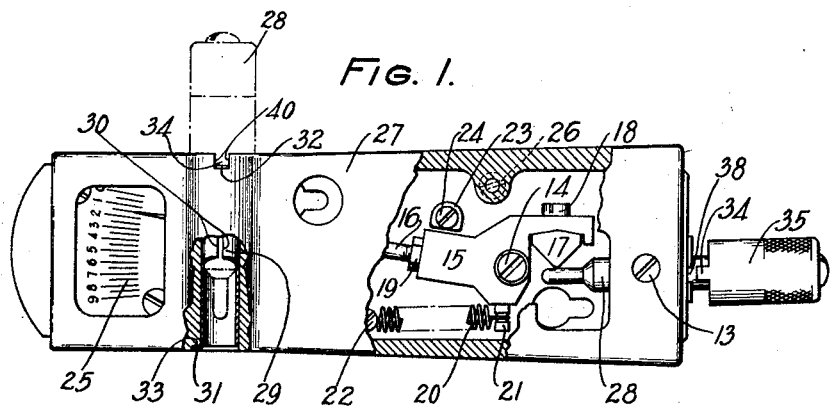
Figure 2:
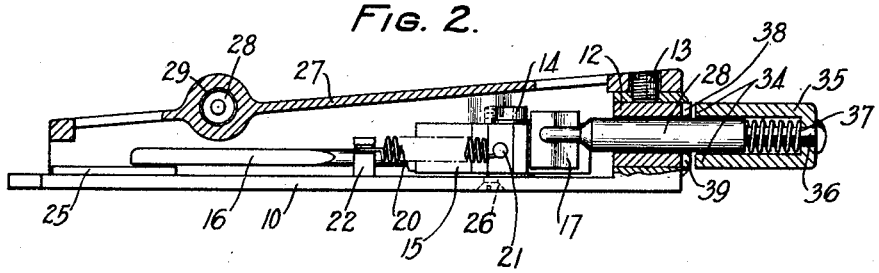
Figure 3:
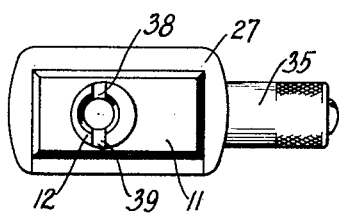
Figure 4:
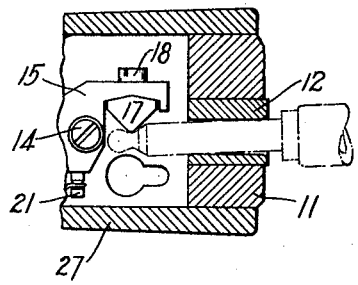

In the drawing, Fig. 1 is a plan view of the gauge showing the test plug in position therein and the housing with portions cut away. Fig. 2 is a side view of Fig. 1 showing the housing and a number of operating parts in section. Fig. 3 is an end view and Fig. 4 is a detail view showing a telephone plug in position in the gauge.

In the drawing, 10 is a supporting plate having at one end a head portion 11 in which an eccentric bushing 12 is mounted and held securely in position therein by a set screw 13. On stud 14 which is secured on the plate 10, there is pivotally mounted a yoke member 15 which carries at one end an anvil piece 17. This anvil is securely held on the yoke 15 by a screw 18. A pointer 16 threadedly engages the other end of the yoke 15 and a counter nut 19 is provided for holding it securely in adjusted position with respect to a scale 25 provided for a purpose that will be hereinafter described in detail. A spring 20 having one end hooked on stud 21 carried by the yoke 15 and the other end hooked on a stud 22 mounted on the plate 10 is provided for holding the anvil 17 firmly against the plug under test as shown in Fig. 4 or the test plug 28 as shown in Figs. 1 and 2, and to hold the pointer 16 in its retracted or zero position against a stop member 23 which in turn is held on the plate 10 by a screw 24. On the end of plate 10 opposite the head piece 11 there is mounted the scale 25 which cooperates with pointer 16 for indicating the wear or the serviceability of the plug under test in hundredths of an inch.

On the plate 10 there is securely mounted, as by a number of screws 26, a housing 27 which is provided for protecting the operating parts against injury and to provide a holder for a testing plug 28.

This holder consists of a tubular member 29 which is provided with a longitudinal slot 30 for permitting the expansion and retraction of the tube upon the removal and insertion of the testing plug in position as shown by the dotted line in Fig. 1. The tube 29 is held against axial and rotary movements in the housing 27 by lugs 31 and 32 in recesses 33 and 40. The recess 40 is made sufficiently deep in order to accommodate the tooth 34 of a knob 35 provided for adjusting the eccentric bushing 12 for a purpose that will be hereinafter described in detail. This knob is slidably mounted on the end of testing plug 28 and is held against rotary movement thereon through its engagement with the square portion 36 at the end of the plug and a spring 37 is provided for holding the knob 35 and the teeth 34 carried thereby out of engagement with the indentations 38 and 39 in the bushing 12.

In the setting of the gauge, the test plug 28 is first inserted in the eccentric sleeve 12 and the knob 35 of the plug 28 is moved against the resistance of spring 37 in position wherein the teeth 34 carried thereby engage the indentations 38 and 39 in sleeve 12. This sleeve may then be rotated until the pointer 16 is moved on the scale 25 from its retracted zero position which is determined by the position of stop 23 to the mark desired which may represent the minimum size of the plug permissible wherein the sleeve 12 is secured by the set screw 13.

In the testing of switchboard plugs, the plug to be tested is inserted in the gauge in position as shown in Fig. 4 wherein the apex of the anvil is forced into the tip spring crevice near the end of the plug. Upon the insertion of the plug in the sleeve 12, the pointer 16 is moved on the scale 25 from its zero retracted position to a mark corresponding to the wear in the collar and in the body portion of the plug, thus giving an indication of its serviceability, the extent of eccentricity of the plug being determined by rotating the plug under test in the sleeve 12 and observing the oscillation of the pointer 16 with respect to the scale 25.

In the case of a given type of telephone spring-jack it is necessary to move the tip spring .0125″ but not over .040″ to have the plug function satisfactorily and any plug, therefore, that gives gauge readings when rotated between these values in the gauge would pass inspection and be considered suitable as far as the tip and sleeve are concerned. A plug having less than .0125″ rise is likely to fail in making contact with the tip spring of the jack and a plug having a rise of more than .040″ is likely to cause butting. The gauge therefore will indicate whether plugs are suitable for further service taking into account sleeve diameter, tip diameter and eccentricity, without disconnecting the plugs from the switchboard.

What is claimed is:

1. In a gauge for measuring the serviceability of plugs, a supporting plate, a pointer pivotally mounted on said plate, a member carried by said pointer, a sleeve mounted on said plate for guiding the plug under test into engageable relation with said member, and a scale co-operating with the pointer.

2. In a gauge for measuring the serviceability of plugs, a pointer, a member carried by said pointer, a sleeve for guiding the plug into engagement with said member for actuating said pointer, a stop for said pointer, a spring for yieldably holding the pointer against said stop and said member against the plug, and a scale for indicating the movement of said pointer.

3. In a gauge for measuring the serviceability of plugs, a supporting plate, a pointer pivoted on said plate, a stop, a spring for holding the pointer against said stop, a member carried by said pointer and arranged to be engaged by a plug for actuating said pointer, a scale for cooperation with said pointer, and a guiding member for the plug mounted in said supporting plate and manually movable, whereby when a master plug is inserted in said guiding member the latter may be properly adjusted so that the pointer reads at zero on the scale.

4. A gauge for testing plugs comprising a mounting plate, a sleeve representing a spring-jack sleeve worn to the limit of permissible wear mounted on said plate, a spring pressed yoke, pivoted on said mounting plate, an anvil mounted on said yoke and shaped and located in said gauge to represent a tip spring of a spring-jack and adapted to engage the tip spring crevice of a plug when inserted in said sleeve, a scale, and a pointer secured to said yoke and movable over said scale.

In witness whereof, I hereunto subscribe my name this 2nd day of December, 1929.

LEON N. HAMPTON.